United States Patent [19]

Arai et al.

[11] Patent Number: 4,638,016

[45] Date of Patent: Jan. 20, 1987

[54] PROCESS FOR PRODUCING HIGH DENSITY ELASTIC POLYURETHANE USING A COMBINATION OF 4-METHYL-1-(2-DIMETHYLAMINOETHYL) PIPERAZINE TOGETHER WITH ANOTHER TERTIARY AMINE CATALYST

[75] Inventors: Shoji Arai; Yutaka Tamano; Masazumi Hasegawa, all of Yamaguchi, Japan

[73] Assignee: Toya Soda Manufacturing Co., Ltd., Shinnanyo, Japan

[21] Appl. No.: 767,870

[22] Filed: Aug. 21, 1985

[51] Int. Cl.$^4$ ............................................. C08G 18/18
[52] U.S. Cl. ...................................... 521/129; 528/53
[58] Field of Search ............................ 521/129; 528/53

[56] References Cited

U.S. PATENT DOCUMENTS 2,949,431  8/1974  Britain ................................. 521/129

FOREIGN PATENT DOCUMENTS 1365015  8/1974  United Kingdom .

OTHER PUBLICATIONS

Britain J. Applied Polymer Science, vol. 4, pp. 207–211 (1960).

Primary Examiner—Maurice J. Welsh
Attorney, Agent, or Firm—Cushman, Darby & Cushman

[57] ABSTRACT

Process for producing a high density elastic polyurethane of reduced weight having excellent resistance to bending, which employs as catalyst 4-methyl-1-(2-dimethylaminoethyl)piperazine or a mixture of 4-methyl-1-(2-dimethylaminoethyl)piperazine and another tertiary amine compound as co-catalyst.

8 Claims, No Drawings

PROCESS FOR PRODUCING HIGH DENSITY ELASTIC POLYURETHANE USING A COMBINATION OF 4-METHYL-1-(2-DIMETHYLAMINOETHYL) PIPERAZINE TOGETHER WITH ANOTHER TERTIARY AMINE CATALYST

FIELD OF THE INVENTION AND RELATED ART STATEMENT

The present invention relates to production of high density elastic polyurethane. Particularly the invention relates to a process for producing an elastomer for use as sole which is excellent in resistance to bending and of reduced weight.

In recent years, polyurethane elastomers have found their increasing applications to various fields of industries such as for sole materials, synthetic and artificial leather and rim products for automobiles. The demand for the material is increasing, since polyurethane elastomer is excellent in the mechanical strength and the resistance to abrasion as well as to oil. Especially, among them, the high density elastic polyurethane finds use for soles because of its superiority in the resistance to bending.

The elastomer used for preparing soles are generally produced by the reaction of two solutions: one solution A is a homogeneous mixture of polyester polyol with a cross linking agent, a catalyst, a blowing agent and various additives; and the other solution B contains an organic polyisocyanate.

As for the catalyst, various kinds of organic metal compounds and tertiary amine catalysts are proposed such as those disclosed in Journal of Japan Rubber Society, Vol. 55, No. 3, p. 79 (1982 ). But in view of desired stability of the solution A during storage and desired high resistance of product soles to bending, triethylenediamine is preferred for the industrial purposes.

Suitable density of elastomers for soles depends on whether the shoes are for men, women or for sportwear. For example, a density of 0.6 g/cm$^3$ is suitable for men's shoes. However, less expensive production of shoes is aimed at by cutting the unit amount of materials per se and the general tendency is that lighter shoes are preferred and in order to meet with this soles of low density are also required.

In order to reduce the density of soles for men's shoes, for example down to 0.6 g/cm$^3$ or so, some technical attempts are being made such as to increase the amount of the blowing agent or to addmix certain trifunctional polyol in the formulation of raw materials.

These trials, however, have been found to often result in lowering the strength of elastomer for soles and, in some extreme cases, the soles may absorb or leak water and the elongation property may be deteriorated. In many cases prior arts sacrificed various properties of the elastomer for soles and could hardly give a low density product which could exhibit high physical properties.

OBJECT AND SUMMARY OF THE INVENTION

The object of the present invention is to provide a process for producing with ease a high density elastic polyurethane of lower density and higher quality than those of any prior art product, and especially to provide novel catalysts suitable for the production of such elastic polyurethane.

The present inventors have conducted long time fundamental investigations on the catalytic activities of the urethane foaming and have investigated on the reduction of weight of elastomer for soles from the point of catalytic activities.

It has been found that selection of catalyst remarkably influences the reduction in weight of the elastomer for soles and the present invention is based on this discovery. Namely, complex reactions proceed almost in parallel in the formation of a urethane foam, but basically they are competitive reactions involving urethane forming reaction in which isocyanate reacts with a polyol to form a urethane bond and a urea forming reaction in which isocyanate reacts with water to form a urea bond and to generate carbon dioxide.

Consequently, the competitive reactions can proceed in good balance to form the elastomer for soles, if a best suited catalyst is selected. As a result, elastomers with very little distortion in the foam structure itself can be obtained as found by the present inventors. The present invention provides a process for producing elastomers for soles of reduced weight and having an excellent resistance to bending comprising using as catalyst 4-methyl-1-(2-dimethylaminoethyl)piperazine(abbreviated hereinafter as TMNAEP) or a mixture thereof with other tertiary amine compounds as co-catalyst. TMNAEP per se is a well known catalyst as disclosed in U.S. Pat. No. 2,949,431 and "Journal of Applied Polymer Science" Vol. 4, No. 11, p. 207 (1960) and in British Pat. No. 1,365,015. These prior arts teach that TMNAEP generally acts as catalyst in the polyurethane formation reaction, and may be employed as catalyst for flexible foams, and for epoxyurethane denatured resins having shock resisting property, but they do not contain a bit of notion of using TMNAEP for high density elastic polyurethane, particularly for reducing the weight of elastomers for soles.

DETAILED DESCRIPTION OF THE INVENTION

The catalyst of this invention is superior in balancing the urethane and urea formation reactions in the production of elastomers for soles.

More particularly, the so-called tack-free time is very close to the rise time. The former is the time at which the formed foam loses the tacking on the surface when the urethane formation reaction of polyurethane has proceeded by far, and the latter is the time at which the foam is no longer observed to further expand at the completion of the urea forming reaction. The tack-free time indicates the time in which hardening is almost completed, so that the rise time close to the tack-free time means that the hardened foam does not continue to expand any more and the elastomer obtained has little distortion in the structure. In other words, when previous catalysts are employed and products are removed from their metallic mould, the products often suffer from so-called shaping problems such as 'shrinking' and 'waving', and therefore it has been difficult to prepare a lower density elastomer.

When the catalysts of this invention are employed, elastomers of reduced density can be prepared without making any change in the formulation and thus the necessary amount of the raw materials can be reduced. In addition, excellent equipments and devices can be used without applying any substantial modification.

The catalysts of this invention have PKa values relatively smaller than those of most tertiary amine catalysts. Therefore, in the solution A which contains a mixture of raw material polyester polyol, cross linking agent, blowing agent and other necessary additives, the polyester polyol is not hydrolyzed and, as a result, the solution A has good stability during storage. Furthermore, the catalysts of this invention do not accellerate the hydrolysis even if the elastomer shaped as soles are exposed to high temperatures and high humidities, and therefore physical properties of the elastomer are not hardly deteriorated by hydrolysis.

The catalysts of the present invention are best miscible with the raw materials of elastomer for soles and therefore exhibit high performance in the hardening stage of operation. As a result, the best property obtained is the high resistance to bending which is the most important property of elastomers for soles. With the catalysts of this invention, the elastomers for soles, even if they are made less dense, the resistance to bending is no less inferior to conventional elastomers. On the other hand, when catalysts other than those of this invention are employed in preparing elastomers for soles of low density, elastomers obtained is not satisfactory to practical usage on account of their much lower resistance to bending. In producing high density polyurethanes, especially elastomers for soles, production of elastomers of low density with the shaping property improved and the resistance to bending not deteriorated has only been realized for the first time by the present invention. In addition, the catalysts of this invention, due to the low vapor pressure, generate less offensive smell, which otherwise causes difficulties on the production of elastomers for soles. Thus, the invention serves to improve the working environment.

In the process of this invention, an organic solvent may be added, if necessary, to the catalyst of TMNAEP or mixture thereof with other tertiary amine compounds as co-catalyst, to produce less distorted high density elastic polyurethane of lower density, especially elastomers for soles.

TMNAEP of this invention can be permethylated from N-aminoethylpiperazine in a known method such as by Reuckart-Wallach reaction disclosed in U.S. Pat. No. 4,026,840 and by the reductive methylation reaction which is described in Japanese Patent Publication (Appl. No. 58-073,007).

The tertiary amine compounds which can be used as co-catalyst in combination with TMNAEP of this invention include following polular tertiary amine compounds: triethylamine, N,N-dimethylcyclohexylamine, N,N,N',N'-tetra-methylethylenediamine, N,N,N',N'-tetramethylpropylenediamine, N,N,N',N'-tetramethylhexamethylenediamine, N,N,N',N'',N''-pentamethyldiethylenetriamine, N,N,N',N'',N''-pentamethyl-(3-aminopropyl)-ethylenediamine, N,N,N',N'',N''-pentamethyldipropylenetriamine, N,N,N',N'-tetramethylguanidine, triethylenediamine, N,N'-dimethylpiperazine, N-methylmorpholine, N-ethylmorpholine, N-(N',N'-dimethylaminoethyl)morpholine, 1-2-dimethylimidazole, 3-(dimethylamino)-propylimidazole, N,N-dimethylethanolamine, dimethylaminoethoxyethanol, N,N,N'-trimethylaminoethanolamine, 1,3-bis(N,N-dimethylamino)-2-propanol, N-methyl-N'-(2-hydroxyethyl)piperazine, bis(2-dimethylaminoethyl)ether. However, triethylenediamine is the most preferred among them all.

When a tertairy amine compound is employed in a mixture with TMNAEP, the concentration of the tertiary amine compound should be in the range from 0 to 95% by weight, but preferably from 5 to 80% by weight. When the concentration exceeds the value above, the concentration of TMNAEP becomes too lower to achieve the object of this invention.

An organic solvent may be added, if necessary, to a mixture of TMNAEP with a tertiary amine compound. The organic solvent is selected from the group of polyols having 2-3 OH groups in the molecule, such as ethyleneglycol, diethyleneglycol, propyleneglycol, dipropylenegycol, butanediols, hexanediol, and glycerine. But among them, ethyleneglycol, diethyleneglycol and 1,4-butanediol are preferred. These solvents may be used without any particular restriction to the amount of application usually in the range from 5 to 70% by weight. Too large amounts of organic solvent should be avoided because the concentration of amine in the catalyst becomes too low or the organic solvent might give unignorable bad effect on the quality of the products.

The mixing procedure of components of the catalyst composition takes place as follows. In case an organic solvent is needed to make up a catalyst, the solvent is mixed to TMNAEP under a nitrogen atmosphere, then a tertiary amine compound as co-catalyst, such as triethylenediamine, is added. Otherwise TMNAEP and the tertiary amine compound may be mixed separately to the original foaming solution.

When the catalyst of this invention is applied to the production of high density elastic polyurethane, particularly of elastomers for soles, the catalyst may be used in an amount of 0.05 to 10 parts, preferably 0.1 to 5 parts, per 100 parts of polyol. This catalyst may be used in parallel with commonly known organic tin compounds.

The composition of the raw materials of this invention is the same one as that used for ordinary high density elastic polyurethane. For example, while so-called polyols include polyesterpolyol, polyetherpolyol, and polyetherester (a copolymer of ester and ether), polyesterpolyols are particularly preferred among them. For the component for polyesterpolyol are preferably selected aliphatic carboxylic acids such as malonic, succinic, adipic, pimelic and sebacic acids, and aliphatic glycols such as ethyleneglycol, butyleneglycol, and propyleneglycol.

Polyesterpolyols employed in this invention are those polymers prepared by known methods from a combination of each one or more of these acids and glycols, or a mixture of those polyesters. Molecular weight of these polyesterpolyols should be 500–4,000, preferably 800–2,200.

In the same way, polyisocyanates of this invention are not particularly restricted, but aromatic polyisocyanates and prepolymers thereof are preferred, and the most preferable are MDI, TDI and the prepolymers of these isocyanates. Further, diisocyanates and/or isocyanate prepolymers may be those semiprepolymers which can be prepared by a commonly known method by the reaction of a diisocyanate with a compound having two active hydrogen atoms reactable with an isocyanate. These polyisocyanates, prepolymers and semiprepolymers may be those to which some acid ingredients or other stabilizers are admixed beforehand to suppress deterioration of properties. Cross linking agents include diols having a molecular weight of 62–400 such as ethyleneglycol, 1-4-butanediol, propyleneglycol, diethyleneglycol, dipropyleneglycol, and hexanediol, but the most preferred are ethyleneglycol, 1,4-butanediol and diethyleneglycol. Usable blowing agents include water and those low boiling aliphatic halogen compounds of common use such as trichloromonofluoromethane, and methylenechloride, either alone or a combination thereof. But the most preferred is water when it is used alone.

Furthermore, various kinds of additives may be used in this invention. They include, for example, cell stabilizers and surfactants to provide the products with a tiny and uniform structure and, when necessary, a variety of pigments and dyestuffs for coloring the products and in some cases flame-retarding agents. The species and the amount of these additives are not limited insofar as they remain within the formality and usage of the common knowledge.

DESCRIPTION OF PREFERRED EMBODIMENTS

Actual examples of the present invention are illustrated below on the comparative description of reference examples, but this invention is not restricted to the examples. Examples 1, 2

A free foaming was carried out with the aid of the catalyst of this invention using the following formulation. As a result thereof, very close values were obtained for the tack-freee time and the rise time. Elastomers formed were of little distortion in the cellar structure of the foam. The elastomers were less dense, more elastic and tenacious.

Formulation

| Formulation | (Pbw) | |
|---|---|---|
| Polyesterpolyol[1] | 100 | |
| Water | 0.4 | |
| Silicone Foam Adjuster[2] | 1.0 | Solution A |
| Cross linking agent[3] | 19.0 | |
| Catalyst[4] | Varied | |
| Semiprepolymer[5] | Index 100 | Solution B |

[1]Nipporan N-141 Adipate polyesterpolyol available from Nippon Polyurethane Company. Molecular weight 1,000, OH value, 105 mgKOH/g.
[2]Silicone surfactant available from Torey Silicones. SH-193
[3]1,4-Butanediol available from Toyo Soda Mfg. Co., Ltd.
[4]Triethylenediamine (TEDA-L30B, or solution of 1.4-butanediol containing 30% of triethylenediamine), and TMNAEP (TOYOKAT-NP) available from Toyo Soda Mfg. Co., Ltd.
[5]Coronate C-4,020 An organic isocyanate (semi-prepolymer) available from Nippon Polyurethane Co.

Conditions of foaming

| Temperature of solutions A and B | 40° C. |
|---|---|
| Speed of agitation | 5,000 r.p.m. |
| Foaming vessel (Polyethylene beaker) | 500 cc |

Explanation

CT (Cream time) Time interval between mixing of the raw material solutions and initiation of the urea formation reaction in which the urea bonds are formed and carbon dioxide is evolved.

TFT (Tack-free time) Time to the point where hardening of polyurethane surface proceeds in an elastomer formation reaction and the tacking is no more felt by fingers. Usually it corresponds to the rate of the urethane formation reaction.

RT (Rise time) Time to the point where the urea formation reaction has almost completed and the foam height has reached the maximum.

$\rho$ (Foam density)

REFERENCE EXAMPLE 1

Free foaming was carried out using the same process as in Example 1, except that TEDA-L30B was employed as catalyst.

As a result, the tack-free time obtained was different by far from the rise time on account of the reaction rate. The elastomer produced had a high foam density and a remarkably distorted foam-cell structure.

TABLE 1

Comparison of reactivity of catalysts

| | Catalyst (part) | | | | | |
|---|---|---|---|---|---|---|
| | TMNAEP | TEDA-L30B | CT | TFT | RT | $\rho$ |
| Example 1 | 2.1 | — | 7.5 | 50 | 57 | 0.272 |
| Example 2 | 0.7 | 1.1 | 7.5 | 50 | 68 | 0.276 |
| Reference Example 1 | — | 1.6 | 7.5 | 50 | 80 | 0.283 |

EXAMPLES 3, 4

Mechanical foaming was carried out using the same formulation as in Examples 1 and 2. More particularly, a solution A consisting of polyesterpolyol, water, silicone foam adjusting solution, cross linking agent and catalyst was stirred and kept at 40° C. On the other hand, solution B of semi-prepolymer was also kept at 40° C. The two solutions A and B were delivered into an aluminum mold with the index being adjusted to be 100. The aluminum mold was 200 mm×200 mm×10 mm large, and kept warmed at 40° C. by means of a plane heater. 5 and a half minutes after the solutions were mixed, a foam was obtained from the mold. Density of the foam was estimated from the weight (in grams) divided by the volume (in cc), and hardness was measured with a Shore C hardmeter immediately and 3 days after the demolding at 20° C.

The tensile strength and the elongation property were measured according to JIS-K6301. In order to estimate the De Martia flexing, a test piece of a dimension 150 mm ×25 mm×10 mm was cut off and the crack developing speed was measured according to ASTM D430. Namely, a crack of 2 mm was cut on the test piece and the piece was repeatedly bent with the use of De Martia test machine, to obtain the resistance to bending of the product from the number of bending and the speed of crack developing. Results are shown in Table 2.

REFERENCE EXAMPLES 2, 3

Using the same formulation as in Reference Example 1, and following the same procedure as in Examples 3 and 4, forms of different densities were produced. Physical properties of these foams are tabulated in Table 2.

TABLE 2

Comparison of physical properties

| | | Example 3 | Example 4 | Reference 2 | Reference 3 |
|---|---|---|---|---|---|
| Catalyst TMNAEP | | 2.1 | 0.7 | — | — |
| Parts TEDA-L30B | | | 1.1 | 1.4 | 1.4 |
| Density ($\rho$) | | 0.50 | 0.51 | 0.51 | 0.60 |
| Hardness (Shore C) | Immediate | 74 | 73 | 75 | 77 |
| | In 3 days | 85 | 85 | 84 | 87 |
| Tensile strength | | 80 | 80 | 81 | 80 |
| Elongation | | 430 | 410 | 400 | 410 |

TABLE 2-continued

| | Comparison of physical properties | | | |
|---|---|---|---|---|
| | Example 3 | Example 4 | Reference 2 | Reference 3 |
| Resistance to bending of product (mm)* | 1.8 | 2.0 | 8.4 | 2.3 |

*Length of crack developed by 50,000 time repeated bending, or the total length minus the initial length of crack.

We claim:

1. Process for producing a high density elastic polyurethane of reduced weight which comprises a polyol having a molecular weight of 500–4,000, a cross linking agent, a blowing agent, an organic polyisocyanate which is a terminal isocyanate prepolymer which is the reaction product of polyisocyanate and/or of a mixture of polyisocyanate and a compound containing two or more active hydrogen atoms in the molecule, comprising employing as catalyst 4-methyl-1-(2-dimethylaminoethyl) piperazine or a mixture of 4-methyl-1-(2-dimethylaminoethyl)piperazine and another tertiary amine compound as co-catalyst.

2. Process according to claim 1, wherein polyol is polyester polyol.

3. Process according to claim 2, wherein said polyester polyol is polyester diol which is prepared from adipic acid and diol.

4. Process according to claim 1, wherein said other tertiary amine compound is triethylenediamine.

5. Process according to any one of claims 1 through 4, wherein employed is a mixture of 20–95% by weight of 4-methyl-1-(2-dimethylaminoethyl)piperazine as catalyst and 5–80% by weight of triethylene diamine as co-catalyst.

6. Process according to any of claims 1 through 5, wherein said high density elastic polyurethane is an elastomer for use as sole.

7. A process according to claim 6 wherein there is employed a mixture of 20–95% by weight of 4-methyl-1-(2-dimethhlaminoethyl) piperazine as catalyst and 5–80% by weight of triethylene diamine as cocatalyst and the polyol is a polyester diol which has been prepared from adipic acid and a diol.

8. A process according to claim 5 wherein the polyol is a polyester diol which has been prepared from adipic acid and a diol.